Patented Apr. 4, 1939

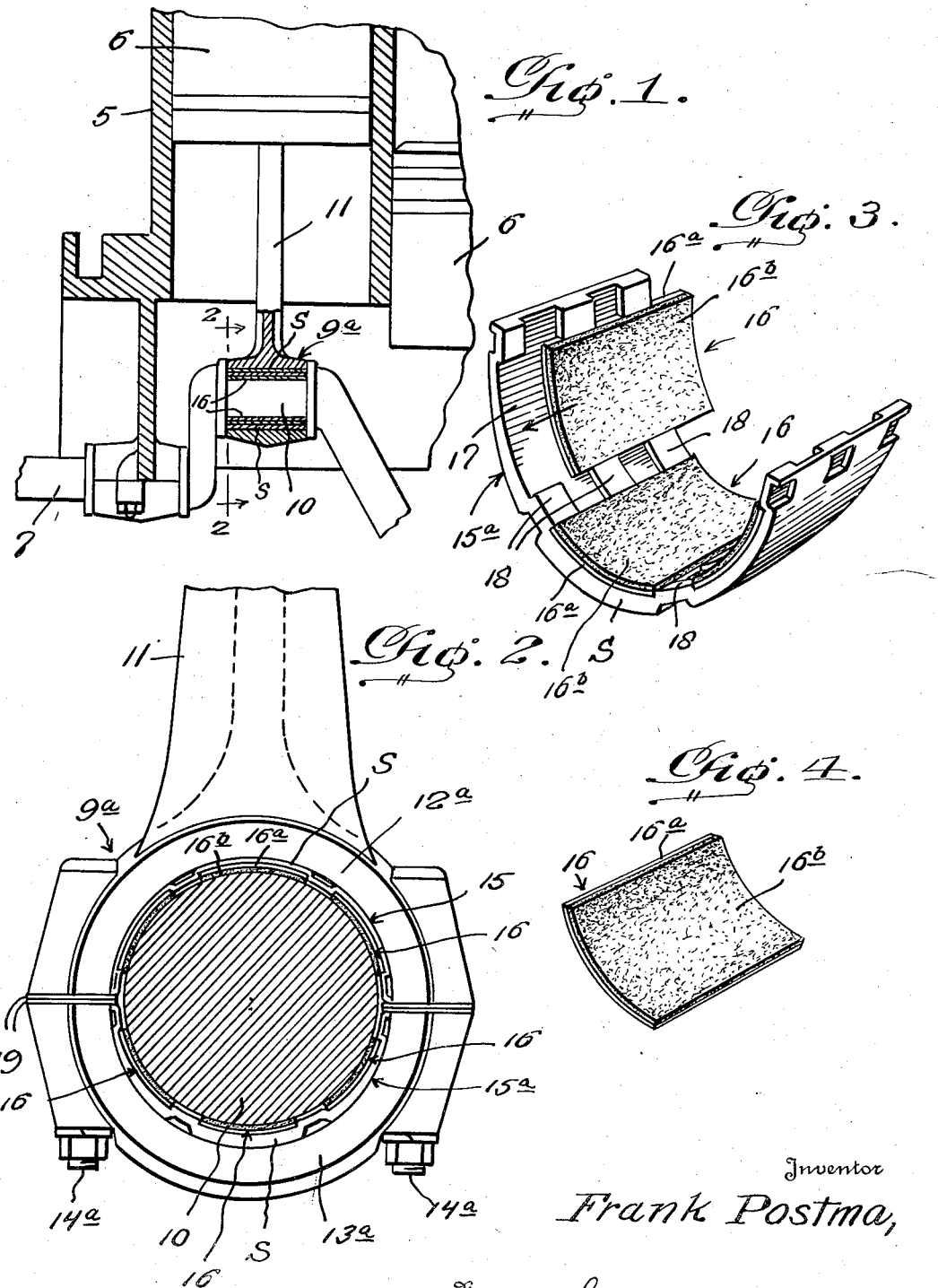

2,153,272

UNITED STATES PATENT OFFICE 2,153,272

ABRADING LINER

Frank Postma, Ridgewood, N. J.

Application August 18, 1938, Serial No. 225,617

5 Claims. (Cl. 51—204)

This invention relates to devices for abrading and thereby truing worn crank pins of crank shafts for internal combustion engines and the like, without removing the crank shaft from the engine, and has more particular reference to an improved abrading liner of the type adapted to be substituted for the bearing liners of the engine connecting rod as generally disclosed in my co-pending application for U. S. Letters Patent Ser. No. 164,389 filed September 17, 1937.

An object of the present invention is to provide an abrading liner of the above kind which is extremely durable and efficient, and wherein the abrading element may be readily applied or removed as required.

Another important object of the present invention is to provide an abrading liner consisting of a pair of semi-cylindrical members adapted to be retained in correct positions with respect to each other and the connecting rod bearing, by means of shims interposed between the sections of the connecting rod bearing, one of the semi-cylindrical members being tapered gradually to increased thickness from the ends to a point intermediate the ends thereof so as to take up the clearance between the lower portion of the crank pin and the connecting rod bearing cap due to adjustment of the connecting rod bearing out of round when the shims are placed between the sections of the connecting rod bearing.

More particularly, the present invention aims to provide an abrading liner of the above kind including a pair of semi-cylindrical members, each composed of an outer carrier shell having a plurality of recesses or seats in the inner surface thereof into and out of which flexible removable abrading elements may be readily slid transversely of the carrier shell. These recesses are in the form of transverse grooves or guideways which receive the removable abrading elements, and said abrading elements preferably consist of curved sheets composed of a thin metallic backing having abrading material bonded to the inner surface thereof.

Other objects and features of the present invention will become apparent from the following description when considered in connection with the accompanying drawing, wherein:

Figure 1 is a fragmentary sectional view showing an engine whose connecting rod bearing is provided with an abrading liner embodying the present invention.

Figure 2 is an enlarged fragmentary section taken on line 2—2 of Figure 1.

Figure 3 is an enlarged perspective view of one of the abrading liner sections employed in Figures 1 and 2; and Figure 4 is an enlarged perspective view of one of the abrading elements forming part of the abrading liner shown in Figures 1 to 3 inclusive.

Referring in detail to the drawing, 5 indicates an engine cylinder block having pistons 6 reciprocable in the cylinders thereof. As usual, the engine crank shaft 7 has a plurality of spaced journals mounted in bearings of the engine block, and the cranks of said crank shaft have journals 10 engaged in a bearing 9a provided on the lower end of each connecting rod 11, to the upper end of which a piston 6 is attached. As is well known in the art, each bearing 9a includes a half bearing or bearing block integral with the lower end of the connecting rod and a separate half bearing or bearing cap 13a detachably bolted as at 14a to the bearing block 12a. As is also well known in the art, the bearings 9a are usually provided with thin bearing liners which are seated loosely in the bearings and clamped therein by the bolts 14a by which the sections of the bearings are clamped together. Each of these bearing liners usually consists of a pair of semi-cylindrical members composed of a thin outer shell adapted to seat against the bore of the bearing and having bonded to its inner surface suitable antifriction material which engages the crank shaft journal. The bearing liner sections are usually the same width or length as the bearing and are seated in contacting relation with each other at their end or longitudinal edges.

In accordance with the present invention, improved abrading liners, conforming in general size and shape to the usual bearing liners, are provided for substitution for the usual bearing liners, such abrading liners each consisting of a pair of semi-cylindrical members 15 and 15a, each composed of a thin outer carrier shell S adapted to seat against the bore of the bearing and provided on its inner surface with an arcuate series of removable abrading elements 16. Each abrading element 16 consists of a thin sheet metal or equivalent backing 16a having granular abrading material 16b bonded to its inner surface so as to bear upon the crank shaft journal 10. These abrading elements are of the same width as the bearing and are resilient and flexible as well as curved to substantially conform to the curvature of the carrier shell S. Each carrier shell S is formed with a plurality of transverse guideways or seats 17, each of which is adapted to removably receive one of the abrading elements 16 so that the latter snugly fits and is retained therein by the tension of the abrading element and its frictional engagement with the sides of the seats or grooves 17. The abrading element 16 may be readily inserted or removed by sliding the same transversely with respect to the associated carrier shell S as indicated in Figure 3, and these seats or guideways 17 are preferably formed by providing the carrier shell S at the ends and at suitable spaced intermediate points with transverse rows of inwardly embossed rectangular projections 18. Thus, the carrier shell S may be readily formed by a stamping operation, and the thickness thereof has been exaggerated in the drawing for sake of clearness. It will also be understood that the depth or extent to which the projections 18 extend inwardly is less than the thickness of the abrading elements 16 so that they will not contact the crank shaft journal 10, the latter being solely contacted by the abrading material 16b of the abrading element. In this way, a plurality of relatively short abrading elements are provided which will operate efficiently and which will effectively resist ready destruction in use, are provided. This has a decided advantage over the use of an arcuate abrading element of continuous form from end to end as in my above-mentioned application.

In order to retain the abrading liner sections in the correct positions with respect to each other and the bearing, shims 19 are interposed between the bearing sections 12a and 13a, such shims projecting inwardly for engagement between and with the ends of the carrier shell S of the abrading liner sections. When these shims are employed, the bearing cap 13a is dropped so that the inner surface thereof is eccentric to the inner surface of the bearing block 12a and the surface of the journal 10. In order to take up this clearance at the bottom of the bearing, the carrier shell S of the lower abrading liner section is tapered gradually thicker from the ends to a point intermediate the ends thereof as clearly shown in Figures 2 and 3. This insures proper contact of the abrading element of the lower abrading liner section with the journal 10, the carrier shell S of the upper abrading liner section being of uniform thickness throughout.

In use, the abrading liners are placed in the bearing and clamped or bolted therein by the bolts 14a, whereupon crank shaft 7 is rotated by any suitable or preferred means so as to subject the journal of the crank shaft to the abrading action of the abrading liner. As the abrading operation proceeds, the abrading element 16 may be renewed, and thicker abrading elements may be placed in use as the abrading operation proceeds. Abrading elements with relatively coarse abrading material may be used at the start of the abrading operation, final smoothing of the journal being subsequently effected by the use of abrading elements having fine abrading material.

From the foregoing description, it will be seen that I have provided an efficient abrading liner which will be economical to manufacture and convenient to use. Minor changes in the specific details illustrated and described, are contemplated within the spirit and scope of the invention as claimed.

What I claim as new is:

1. As a new article of manufacture, an abrading liner for engine crank shaft bearings, consisting of a pair of semi-cylindrical outer carrier shells of relatively stiff and strong sheet material adapted to seat against the bore of the bearing and having a series of transverse recesses on the inner face thereof, and a plurality of abrading elements, each removably disposed in one of said recesses and composed of a thin flexible member having an abrading inner surface.

2. As a new article of manufacture, an abrading liner for engine crank shaft bearings, consisting of a pair of semi-cylindrical outer carrier shells of relatively stiff and strong sheet material adapted to seat against the bore of the bearing and having a series of transverse recesses on the inner face thereof, a plurality of abrading elements, each removably disposed in one of said recesses and composed of a thin flexible member having an abrading inner surface formed of granular abrading material, and an outer backing of relatively stiff and strong material to which said abrading material is bonded.

3. As new article of manufacture, an abrading liner for engine crank shaft bearings, consisting of a pair of semi-cylindrical outer carrier shells of relatively stiff and strong sheet material adapted to seat against the bore of the bearing and having a series of transverse recesses on the inner face thereof, a plurality of abrading elements, each removably disposed in one of said recesses and composed of a thin flexible member having an abrading inner surface, the outer carrier shell of each abrading liner member having inwardly embossed rows of transverse projections forming said seat therebetween.

4. As a new article of manufacture, an abrading liner for engine crank shaft bearings, consisting of a pair of semi-cylindrical outer carrier shells of relatively stiff and strong sheet material adapted to seat against the bore of the bearing and having a series of transverse recesses on the inner face thereof, a plurality of abrading elements, each removably disposed in one of said recesses and composed of a thin flexible member having an abrading inner surface, the outer carrier shell of each abrading liner member having inwardly embossed rows of transverse projections forming said seat therebetween in the form of transverse grooves, and said abrading elements being frictionally fitted in said grooves for insertion or removal by sliding the same transversely with respect to said outer carrier shell.

5. In combination with a crank shaft bearing including a bearing block and a bearing cap detachably bolted together, shims interposed between said bearing block and said bearing cap so that the inner surface of the latter is disposed eccentric to the inner surface of said bearing block, and an abrading liner consisting of a pair of semi-cylindrical members, each semi-cylindrical member comprising an outer carrier shell having thin flexible abrading elements removably applied to the inner surface thereof, one of said carrier shells which is associated with the bearing cap tapering gradually thicker from the ends to a point intermediate the ends thereof so as to fully occupy the correspondingly shaped clearance space between said bearing cap and the crank shaft journal, said shims projecting inwardly between the ends of said outer carrier shells to retain the abrading liner members in correct positions with respect to each other and the bearing.

FRANK POSTMA.